United States Patent

Rao

[11] Patent Number: 5,402,048
[45] Date of Patent: Mar. 28, 1995

[54] NODDING SCANNER

[75] Inventor: Shankar S. Rao, Hauppauge, N.Y.

[73] Assignee: Vernitron Corporation, New York, N.Y.

[21] Appl. No.: 173,071

[22] Filed: Dec. 27, 1993

[51] Int. Cl.$^6$ ............................................. H04N 3/06
[52] U.S. Cl. ................................. 318/560; 318/561; 250/234; 250/235
[58] Field of Search ................... 318/560–646, 318/127; 348/164, 205; 372/20, 9, 16, 19, 102, 108; 359/198, 221, 212, 217, 213; 358/530, 465, 467, 539, 484, 505, 494; 128/660.1; 346/108, 76 L; 250/271, 235, 234, 236

[56] References Cited

U.S. PATENT DOCUMENTS

| | | | |
|---|---|---|---|
| 3,642,344 | 2/1972 | Corker | 350/6 |
| 3,831,076 | 8/1974 | Burke et al. | 318/627 |
| 4,151,555 | 4/1979 | Burnett | 358/75 |
| 4,151,834 | 5/1979 | Sato et al. | 128/660 |
| 4,257,053 | 3/1981 | Gilbreath | 346/108 |
| 4,476,717 | 10/1984 | Murphy | 73/159 |
| 4,518,254 | 5/1985 | Penny et al. | 356/5 |
| 4,575,625 | 3/1986 | Knowles | 235/467 |
| 4,578,810 | 3/1986 | MacFarlane et al. | 382/8 |
| 4,601,036 | 7/1986 | Faxvog et al. | 372/20 |
| 4,755,876 | 7/1988 | Dangler | 358/264 |
| 4,859,846 | 8/1989 | Burer | 250/234 |
| 4,919,500 | 4/1990 | Paulsen | 350/6.6 |
| 4,990,808 | 2/1991 | Paulsen | 310/113 |
| 5,047,630 | 9/1991 | Confer et al. | 250/235 |
| 5,291,214 | 3/1994 | Back et al. | 346/1.1 |

Primary Examiner—Paul Ip
Attorney, Agent, or Firm—Scully, Scott, Murphy & Presser

[57] ABSTRACT

A limited rotation assembly for an optical scanner. This assembly includes an input command unit and a signal generator and an electronic driver and a summing junction and a torquer connected in series. The torquer has a tachometer with a start-stop pulse feedback loop to the signal generator and with an angular velocity and position pulse feedback loop to the summing junction.

5 Claims, 6 Drawing Sheets

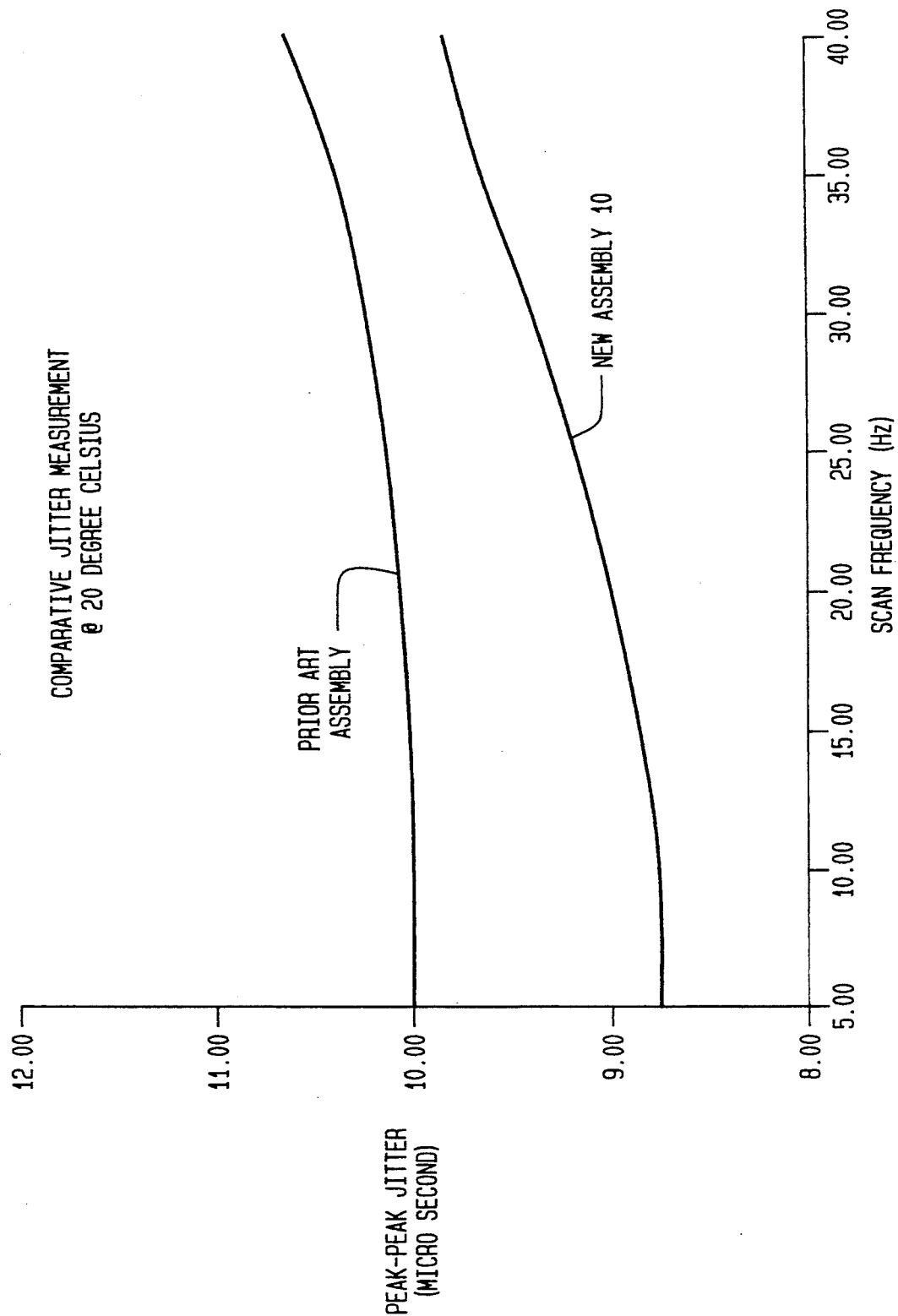

NODDING SCANNER

This invention relates to oscillation motors used to scan beams of light and more particularly to a galvanometer type scanner or nodding scanner to drive a mirror and more specifically to a position servomechanism used to drive the mirror.

BACKGROUND OF THE INVENTION

One such prior art scanner is described in U.S. Pat. No. 3,970,979, issued Jul. 20, 1976. Other related patents include U.S. Pat. Nos. 3,959,673 issued May 25, 1976; 4,076,998 issued Feb. 28, 1978; 4,990,808 issued Feb. 5, 1991; and 5,048,904 issued Sep. 17, 1991.

The prior art scanner described in U.S. Pat. No. 3,976,979 includes a capacitive drive circuit having an output conductor, a summing junction having an input connected to the drive output conductor, a drive rotor having an elongate axis, a drive stator having a drive coil connected to an input of the summing junction, a sensor rotor having a sensor coil connected to a second input of the summing junction whereby a capacitive feedback loop is provided for modifying a drive signal from the summing junction output.

One problem with the prior art nodding scanners is that their performance data is not always suitable for current sensitive applications.

SUMMARY OF THE INVENTION

According to the present invention, a nodding scanner assembly is comprised of an input command unit for providing a preprogram signal, a signal generator connected to the input command unit for providing output position pulses to an electronic driver which sends a pulse sign, a motor tachometer position, an oscillation sensor. The motor tachometer sensor comprises a motor and an oscillation tachometer unit which has a tachometer coil assembly and a tachometer magnet coaxially mounted on the rotor. The tachometer coil assembly has a first output feedback conductor connected to the input of the motor tachometer sensor and a second output conductor connector to the signal generator for providing start and stop pulses to the signal generator, a junction and having a second output conductor connected to the signal generator for providing start and stop pulses to the signal generator, and scanner means coaxially mounted of the shaft.

By using the signals from the first and second output connectors, the mirror and shaft angular velocity signals can be obtained, such that the nodding scanner has performance characteristics which are suited to scanning angular position as a function of time to an accuracy which is not available in prior art limited rotation devices.

A principal object of the present invention is to provide a nodding scanner which has performance characteristics suitable for sensitive instruments having scanning apparauts.

Another object of the present invention is to provide a limited rotation assembly having a pulse-type drive and uses a preprogram, and which has a pulse type feedback loop with a pulse-type output signal to operate an optical scanning mirror.

These and other objects and many of the attendant advantages of this invention will be readily appreciated as the same becomes better understood by reference to the following detailed description when considered in connection with the accompanying drawings in which:

BRIEF DESCRIPTION OF THE PREFERRED DRAWINGS

FIG. 1 is a block diagram of a limited rotation assembly according to the invention;
FIG. 2 is a schematic diagram of a portion of FIG. 1;
FIG. 3 is a sectional view of a portion of FIG. 1;
FIG. 4 is a graph of percent linearity versus temperature (Celsius);
FIG. 5 is a graph of jitter (microsecond) versus temperature (Celsius);
FIG. 6 is a graph of percent linearity versus scan frequency (HZ);
FIG. 7 is a graph of peak-peak jitter (microsecond) versus scan frequency (HZ).

DESCRIPTION OF THE PREFERRED EMBODIMENT

Figure 1:
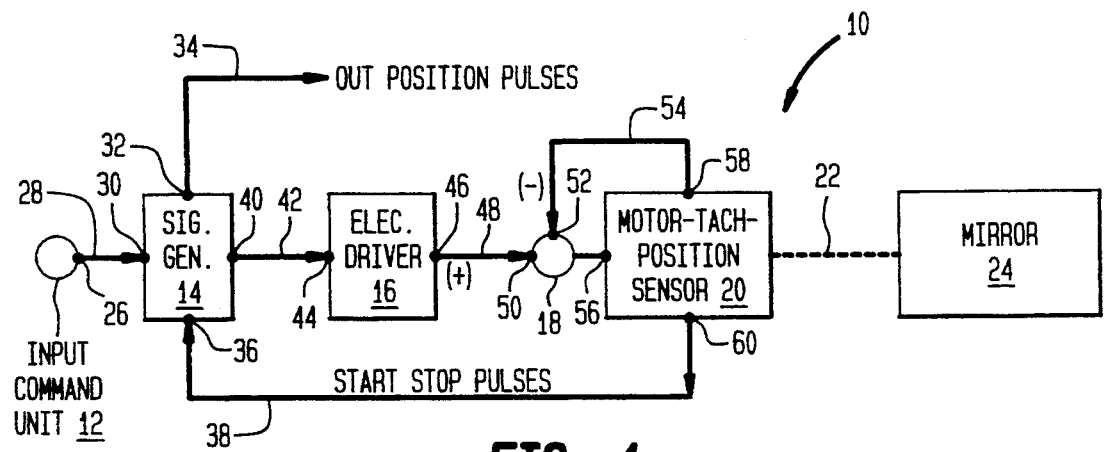
Figure 2:
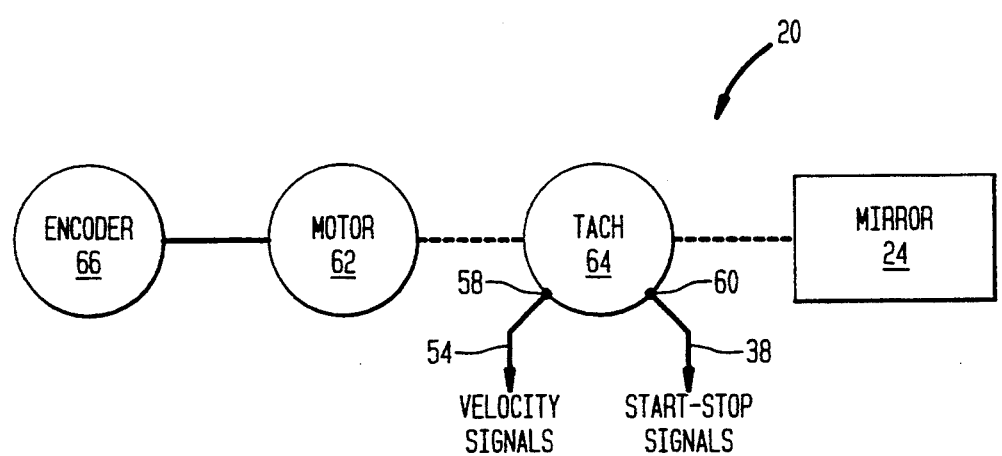
Figure 3:
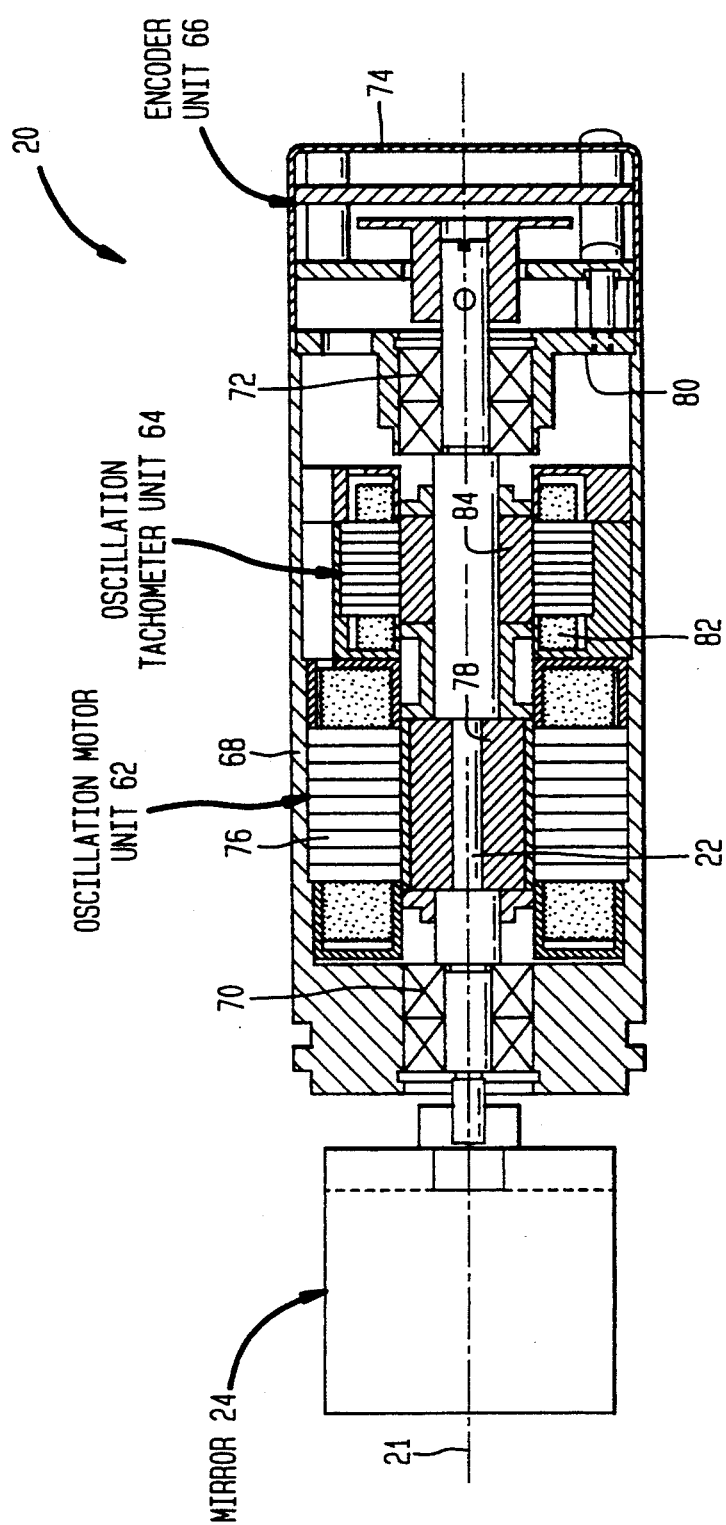

As shown in FIGS. 1, 2, and 3, an oscillation motor assembly or a limited rotation assembly or a nodding scanner assembly 10 is provided. Assembly 10 has an input command unit 12, a signal generator 14 to which is connected to input command unit 12. An electronic driver 16, which is connected to signal generator 14, and a summing junction 18, which is connected to electronic driver 16. Assembly 10 also has a motor and tachometer oscillation subassembly 20, which is connected to summing junction 18, and which has a shaft 22 having an axis 21. The subassembly 20 has a scan device or mirror 24, which is fixedly connected to shaft 22.

Input command unit 12 has an output terminal 26 with a wire or conductor 28, which is connected to an input terminal. Signal generator 14 has a first input terminal 30, which is connected to conductor 28. Signal generator 14 also has a first output terminal 32, which is connected to a conductor 34. Signal generator 14 also has a second input terminal 36, which is connected to a conductor 38, and has a second output terminal 40, which is connected to a conductor 42.

Electronic driver 16 has an input terminal 44, which is connected to conductor 42, and has an output terminal 46, which is connected to a conductor 48. Summing junction 18 has a first input terminal 50, which is connected to conductor 48, and has a second input terminal 52 which is connected to a feedback conductor 54. The summing junction 18 also has an output terminal 56 connected to the motor tachometer of subassembly 20.

The oscillation subassembly 20 has a first output terminal 58, which is connected to the conductor 54, and a second output terminal 60, which is connected to the conductor 38. Subassembly 20 (FIG. 3) has an oscillation actuator or torquer or motor unit 62, and an oscillation tachometer unit or alternator unit 64, and an optical encoder unit 66.

The oscillation subassembly 20 has a casing or housing 68, and a left and a right bearing unit 70,72, which are supported by the casing 68, and which also supports the shaft 22. The subassembly 20 has an end cap 74. The motor unit 62 has a drive stator 76 which is mounted in the casing 68 and a first drive rotor 78 which is attached to the shaft 22. The right bearing 72 is supported by a right end wall portion 80 and the left bearing 70 is supported by the casing 68 at the end portion thereof.

The tachometer 64 has a coil assembly 82, which is supported by the casing 68 and a magnet 84 which is supported by the shaft 22.

FIGS. 4, 5, 6 and 7 each shows and compare a test data curve of a model of the commercially available prior art nodding scanner assembly with a test data curve of a prototype of new assembly 10 according to the invention. A comparison of each pair of curves shows the improved performance characteristics of the new assembly 10.

Figure 4:
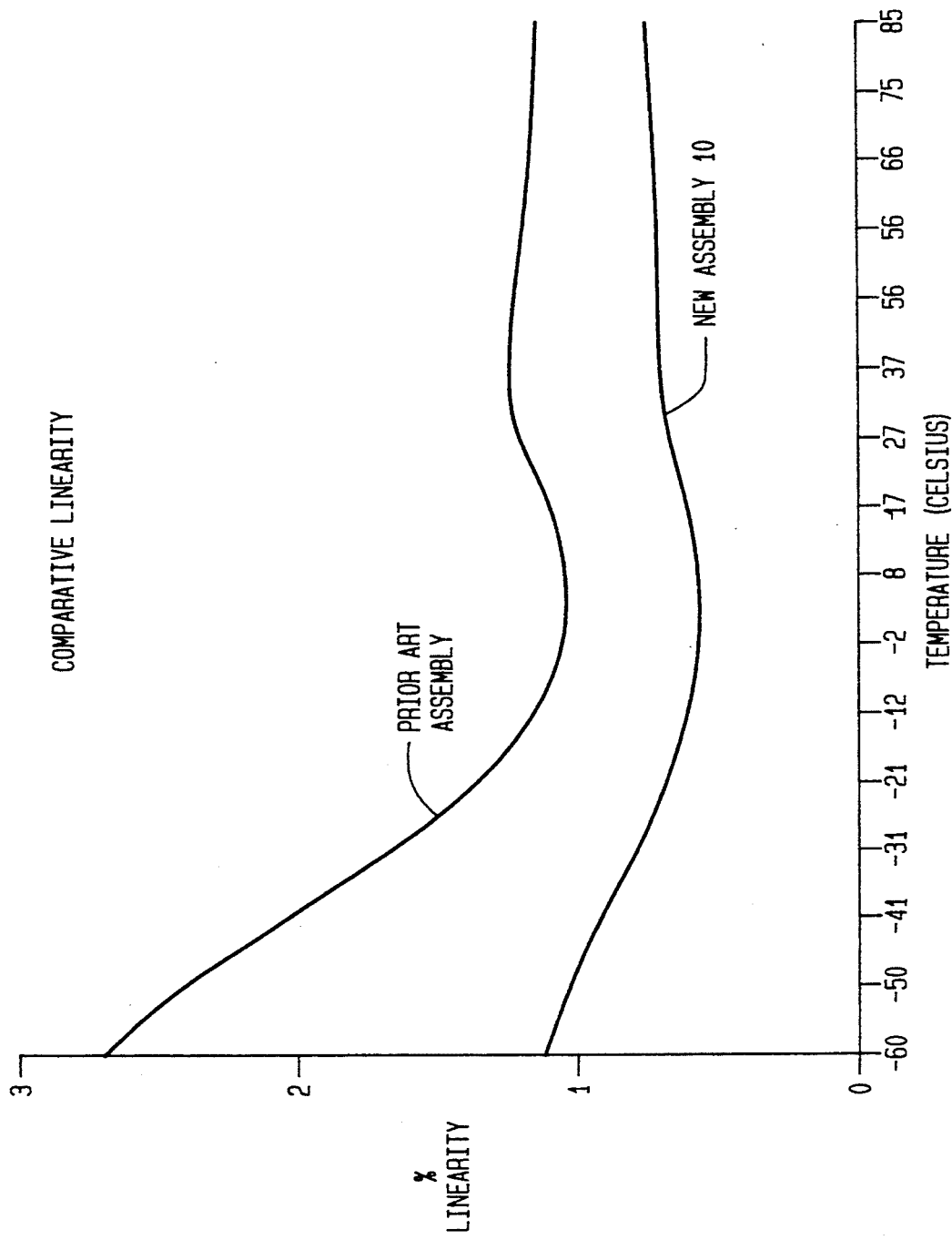
Figure 5:
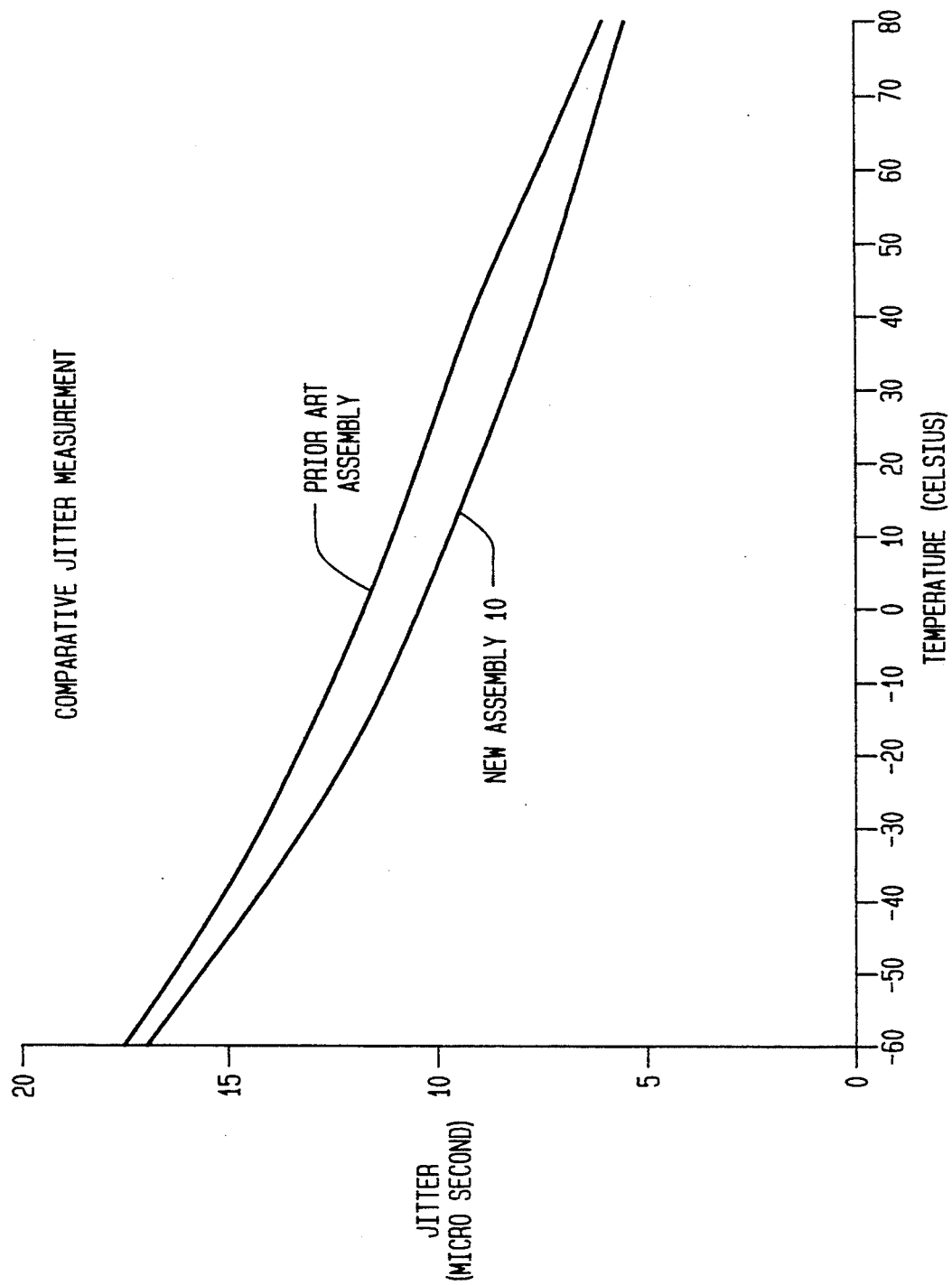
Figure 6:
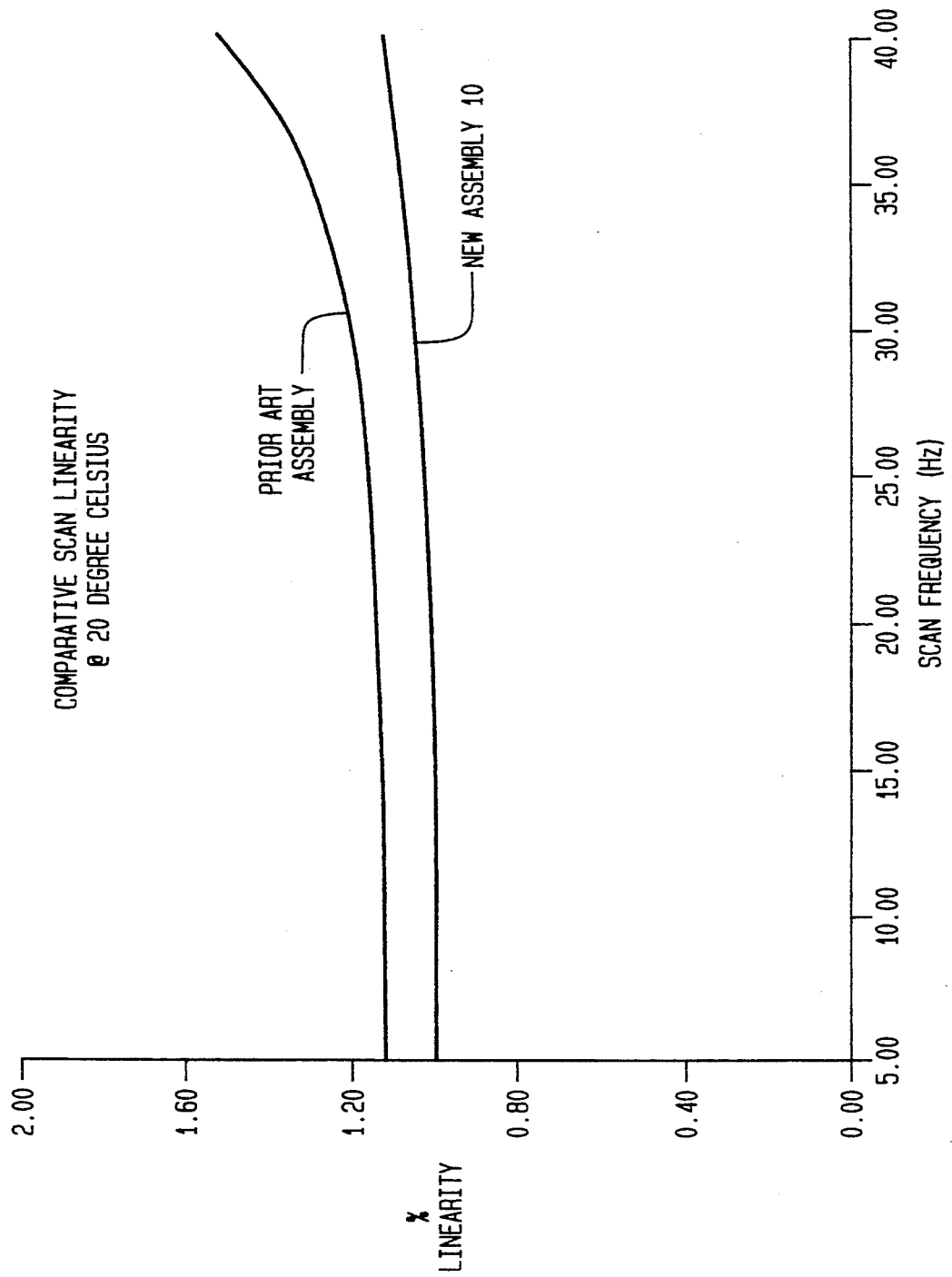

FIG. 4 shows the comparative linearity in a graph of percent linearity versus temperature. FIG. 5 shows the comparative jitter measurement in a graph of jitter (microsecond) versus temperature (Celsius). FIG. 6 shows the comparative linearity at 20 degree Celsius in a graph of percent linearity versus scan frequency (HZ). FIG. 7 shows the comparative jitter measurement at 20 degree Celsius in a graph of peak-peak jitter (microsecond) versus scan frequency (HZ).

In operation, the mirror 22 reflects a laser beam in an optical scan apparatus (not shown). Input command unit 12 has a preprogram signal carried by a modulated DC wave from a power source (not shown). Assembly 10 is similar to position servo which has an optical reflection feedback. The preprogram provides a selective active scan angle of about 6.0 degrees at a selective velocity. The preprogram also provides an overscan angle of about 0.5 degrees at a lower velocity. The preprogram can also be adjusted to suit other applications. The mirror 24 has a substantially constant angular velocity over its active range. The shaft 22 and the rotor 78 and the tachometer magnet 84 have the same angular velocity as that of the mirror 24. The tachometer coil 82 and the feedback conductor 54 which carry a velocity signal indicative of the angular velocity and exact angular position of the tachometer magnet 84 and of the mirror 24. This velocity signal is connected to summing junction 18. The encoder 66 also gives the exact or absolute angular position of mirror 24 at any one time, and also gives the home position of the mirror 24. Thus, the home and other positions as given by the tachometer 64, can be checked and verified by the encoder 66.

Advantages of assembly 10 are indicated hereafter:

a. Assembly 10 has a tachometer pickoff feedback loop instead of the prior art motor capacitive pickoff feedback loop whereby performance is improved.

b. The tachometer feedback loop provides both mirror angular velocity and mirror angular position.

c. Assembly 10 has an electronic driver for pulse driving of the servo subassembly 20.

d. Assembly 10 provides performance data, which is substantially better than the prior art corresponding data.

e. Assembly 10 has an oscillation motor unit 62 and an oscillation tachometer unit 64, both of which are disposed coaxially in a common casing for ease of alignment and manufacture.

It should be understood that the foregoing relates to only a preferred embodiment of the invention, which has been by way of example only, and that it is intended to cover all changes and modifications of the example of the invention herein chosen for the purposes of the disclosure, which do not constitute departures from the spirit and scope of the invention.

What is claimed:

1. A nodding scanner, comprising:
   an input command unit;
   a signal generator connected to said input command unit and having an output providing angular position signals;
   an electronic driver connected to said signal generator;
   a summing junction connected to said electronic driver;
   an oscillation torquer unit connected to said summing junction and having a drive stator and a drive rotor;
   a shaft having an axis of rotation and coaxially supporting said drive rotor;
   an oscillation tachometer unit having a tachometer coil assembly and a tachometer magnet coaxially supported on said shaft;
   said tachometer coil assembly having a first output feedback signal connected to said summing junction for providing angular velocity signals, and a second feedback signal connected to said signal generator for providing shaft angular position start and stop pulses to said signal generator; and
   a scanner means coaxially supported on said shaft.

2. A nodding scanner as claimed in claim 1, wherein said scanner means is an optical scan mirror.

3. A nodding scanner as claimed in claim 1, including an encoder coaxially supported on said shaft for providing secondary shaft angular position signals to check said shaft angular position signals from said signal generator.

4. A nodding scanner as claimed in claim 1, wherein said oscillation torquer unit has a peripheral casing with a pair of axially spaced end walls rotatably supporting said shaft.

5. A nodding scanner as claimed in claim 1, wherein:
   said input command unit has an output terminal having an output conductor;
   said signal generator has a first input terminal connected to said input command conductor and has a first output terminal connected to a first output conductor for providing output angular position pulses and has a second input terminal having a second input conductor for receiving start and stop pulses and has a second output terminal having a second output conductor;
   said electronic driver has an input terminal connected to said signal generator second output conductor and has an output terminal having an output conductor; and
   said summing junction has a first input terminal connected to said electronic driver output conductor and has a second input terminal connected to said tachometer first output feedback conductor and has a first output terminal connected to said torquer drive stator.

* * * * *